(12) United States Patent
Kanbe

(10) Patent No.: US 11,662,195 B2
(45) Date of Patent: May 30, 2023

(54) CORRECTION VALUE MEASUREMENT METHOD AND CORRECTION VALUE MEASUREMENT SYSTEM OF POSITION MEASUREMENT SENSOR IN MACHINE TOOL

(71) Applicant: OKUMA CORPORATION, Niwa-Gun (JP)

(72) Inventor: Reiji Kanbe, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 280 days.

(21) Appl. No.: 17/061,723

(22) Filed: Oct. 2, 2020

(65) Prior Publication Data

US 2021/0131789 A1    May 6, 2021

(30) Foreign Application Priority Data

Nov. 6, 2019    (JP) .............................. JP2019-201709

(51) Int. Cl.
  *G01B 11/00*    (2006.01)
  *G01B 5/008*    (2006.01)
(52) U.S. Cl.
  CPC ............ *G01B 11/005* (2013.01); *G01B 5/008* (2013.01)
(58) Field of Classification Search
  CPC ...... G01B 21/045; G01B 5/008; G01B 15/00; G01B 11/005; G01B 5/0014; G01B 11/03; G01B 11/24; G01B 5/012; G01B 5/08; G01B 11/00; G01B 11/002; G01B 11/2425; G01B 15/04; G01B 21/02; G01B 21/042; G01B 11/0608; G01B 11/245; G01B 5/24; G01B 11/007; G01B 11/02; G01B 21/00; G01B 21/04; G01B 21/047; G01B 2210/50; G01B 2290/15; G01B 2290/30; G01B 7/31; G01B 9/02029; G01B 9/02072; G01B 11/27; G01B 3/008; G01B 5/00; G01B 5/30; G01B 21/10; G01B 21/24;
  (Continued)

(56) References Cited

U.S. PATENT DOCUMENTS 10,359,266 B2 *  7/2019  Kanbe ..................... G01B 5/016
2014/0130362 A1 *  5/2014  Ishikawa .............. G01B 21/045
                                                                33/503
(Continued)

FOREIGN PATENT DOCUMENTS

CN    109396958 A  *  3/2019  ............. B23Q 17/00
DE    4134371 A1  *  4/1993  ........... G01B 11/005
(Continued)

*Primary Examiner* — Michael P Stafira
(74) *Attorney, Agent, or Firm* — Burr Patent Law, PLLC

(57)    ABSTRACT

A correction value measurement method includes, measuring a position of a reference sphere, calculating a relative position of the reference sphere with respect to a sensing position from the position of the reference sphere, a length of the position measurement sensor, and a length of the reference tool. The method further includes acquiring a reference tool position as a distal end position of the reference tool using, calculating a length direction correction value of the position measurement sensor from the reference tool position, the position of the reference sphere, the relative position, and a length of the reference tool, and measuring the position of the reference sphere to calculate a radial direction correction value of the position measurement sensor.

5 Claims, 14 Drawing Sheets

(58) Field of Classification Search
CPC .. G01B 2210/44; G01B 2290/70; G01B 3/30; G01B 5/0016; G01B 5/004; G01B 5/06; G01B 5/202; G01B 5/25; G01B 5/252; G01B 7/06; G01B 7/12; G01B 7/282; G01B 7/312; G01B 9/02002; G01B 9/02007; G01B 11/022; G01B 11/026; G01B 11/04; G01B 11/08; G01B 11/2416; G01B 21/08; G01B 21/22; G01B 3/002; G01B 7/30; G01B 9/02011; G01B 9/02049; G01B 5/016; G01B 5/02; G01B 9/02055; G01B 9/02071; G01B 21/20; G01B 2210/58; G01B 5/12; G01B 7/012; G01N 2223/419; G01N 23/046; G01N 1/286; G01N 2223/1006; G01N 2223/33; G01N 2223/3306; G01N 2223/66; G01N 23/083; G01N 21/8806; G01N 21/95692; G01N 2800/164; G01N 29/14; G01N 21/8851; G01N 33/5308; G01N 15/1459; G01N 2015/0038; G01N 2021/052; G01N 2021/6482; G01N 2021/651; G01N 2021/8887; G01N 2035/00465; G01N 21/0332; G01N 21/05; G01N 21/9515; G01N 2201/101; G01N 2203/0274; G01N 27/023; G01N 27/028; G01N 27/04; G01N 3/20; G01N 30/24; G01N 30/30; G01N 30/6095; G01N 30/66; G01N 33/552; G01N 33/553; G01N 35/0099; G01N 35/1095; G01N 1/22; G01N 1/4055; G01N 15/065; G01N 2001/4066; G01N 2021/0181; G01N 2021/8908; G01N 2035/00356; G01N 21/553; G01N 21/554; G01N 21/8901; G01N 2201/0634; G01N 23/044; G01N 2333/91188; G01N 2800/16; G01N 33/18; G01N 33/182; G01N 33/53; G01N 33/543; G01N 33/57434; G01N 33/57484; G01N 33/84; G01N 33/92; G01N 33/96; G01N 35/08; G01N 35/10; G01N 35/1002; G01N 35/1016; G01N 35/1065
See application file for complete search history.

(56) References Cited

U.S. PATENT DOCUMENTS

| | | | | |
|---|---|---|---|---|
| 2015/0292852 A1 * | 10/2015 | Oki | ..................... | G01B 21/042 33/502 |
| 2016/0116275 A1 | 4/2016 | Matsushita et al. | | |
| 2017/0299366 A1 * | 10/2017 | Kanbe | ................ | B23Q 17/0923 |

FOREIGN PATENT DOCUMENTS

| | | | | | |
|---|---|---|---|---|---|
| DE | 4139202 | C2 * | 9/1997 | ............... | B23H 1/04 |
| DE | 19942980 | A1 * | 3/2001 | ............ | B23Q 17/09 |
| DE | 102017206571 | A1 * | 10/2017 | ........ | B23Q 17/0923 |
| DE | 102018221628 | A1 * | 6/2019 | .......... | G01B 11/005 |
| JP | H1190787 | A * | 4/1999 | | |
| JP | 2004317159 | A * | 11/2004 | ............... | G01B 7/12 |
| JP | 2006349410 | A * | 12/2006 | | |
| JP | 2015152576 | A * | 8/2015 | .......... | G01B 21/045 |
| JP | 2016-083729 | A1 | 5/2016 | | |
| JP | 2017-193043 | A1 | 10/2017 | | |
| JP | 6254456 | B2 * | 12/2017 | ............. | G01B 21/00 |
| KR | 101823052 | B1 * | 1/2018 | | |
| WO | WO-9857121 | A1 * | 12/1998 | .......... | G01B 11/007 |

* cited by examiner

1

CORRECTION VALUE MEASUREMENT METHOD AND CORRECTION VALUE MEASUREMENT SYSTEM OF POSITION MEASUREMENT SENSOR IN MACHINE TOOL

BACKGROUND

This application claims the benefit of Japanese Patent Application Number 2019-201709 filed on Nov. 6, 2019, the entirety of which is incorporated by reference.

1. Technical Field

The disclosure relates to a method and a system that measure correction values of a position measurement sensor used to measure a position of a workpiece inside a machine tool.

2. Related Art

There has been used a method that automatically measures and corrects a tool length and a position of a workpiece for highly accurate machining in a machine tool that performs machining on the workpiece mounted to a table with a tool mounted to a main spindle to be rotated.

As the automatic measurement method of the position of the workpiece, for example, a method that acquires a coordinate at a time point when a contact of a probe, like a touch probe 30 as illustrated in FIG. 2, contacts a workpiece 31 or a time point considering a delay is used. In this case, to acquire the coordinate of the workpiece 31 in a Z-axis direction, a length of the touch probe 30 at the contact is required.

A general measuring method of the length of the touch probe 30 at the contact is as follows. A reference tool is mounted to a main spindle 2a, and while the Z-axis is manually operated such that the reference tool contacts a reference surface, such as a table 3, via a block gauge, a position where a gap between the block gauge and the reference tool becomes approximately 0 is found, and a Z-axis coordinate at the time is recorded. Then, the coordinate of the Z-axis position when the touch probe 30 is brought into contact with the reference surface is measured. A value found by subtracting the coordinate recorded with the reference tool and a thickness of the block gauge from the coordinate measured with the touch probe 30 is determined as the length of the touch probe 30 at the contact. However, manual work is required and it has been difficult to automatically measure the length of the touch probe 30 at the contact.

Accordingly, the applicant of the present disclosure has disclosed the following method as a method for automatically measuring a length of a touch probe in Japanese unexamined patent application publication No. 2017-193043 (JP-A-2017-193043). A reference block is attached to a tool sensor, such as a touch sensor and a laser sensor, a coordinate of a Z-axis position where a reference tool contacts the reference block is recorded in advance, and a coordinate of the Z-axis position where the reference tool contacts the tool sensor is acquired. From both coordinates, a relative position between the contact position with the tool sensor and the reference block is made known. Then, the contact position of the tool sensor is acquired with the reference tool, the position of the reference block is measured by a position measurement sensor, and a length of the position measurement sensor is corrected for measurement.

Additionally, the applicant of the present disclosure has disclosed a geometric error identification method that performs calibration in a radial direction of a distal end portion of a touch probe using a measured value of a center initial value of a target ball (reference sphere) in Japanese unexamined patent application publication No. 2016-83729 (JP-A-2016-83729).

When the diameter correction of the touch probe is performed, the method of JP-A-2017-193043 needs to perform a process different from a process of obtaining a probe length using a reference sphere as in JP-A-2016-83729 separately, and therefore time and labor have been taken.

Therefore, an object of the disclosure is to provide a correction value measurement method and a correction value measurement system that allow obtaining correction values of a length and a diameter of a position measurement sensor without taking time or labor.

SUMMARY

In order to achieve the above-described object, there is provided a correction value measurement method for a position measurement sensor in a machine tool according to a first aspect of the disclosure. The correction value measurement method measures a length direction correction value and a radial direction correction value of the position measurement sensor mountable to a main spindle using the machine tool. The machine tool includes translational axes of three or more axes, the main spindle rotatable with a tool mounted thereon, and a table. The correction value measurement method by using a tool sensor and a reference sphere disposed on a side of the tool includes following steps. The first step is acquiring a sensing position of a distal end of the reference tool using the tool sensor in a state where a reference tool serving as a reference for a length of the tool is mounted to the main spindle. The second step is acquiring a given tool measurement position using the reference tool mounted to the main spindle. The third step is acquiring a given sensor measurement position using the position measurement sensor mounted to the main spindle. The fourth steps is obtaining a difference between the tool measurement position and the sensor measurement position to obtain a length of the position measurement sensor based on the difference and a length of the reference tool. The fifth step is measuring a position of the reference sphere using the position measurement sensor mounted to the main spindle. The sixth step is calculating a relative position of the reference sphere with respect to the sensing position from the sensing position acquired by the using, the position of the reference sphere acquired by the measuring, the length of the position measurement sensor calculated by the obtaining, and the length of the reference tool. The seventh step is acquiring a reference tool position as a distal end position of the reference tool using the tool sensor in a state where the reference tool is mounted to the main spindle. The eighth step is calculating a length direction correction value of the position measurement sensor from the reference tool position acquired by the mounting of the reference tool, the position of the reference sphere acquired by the measuring, the relative position calculated by the calculating, and the length of the reference tool. The ninth step is measuring the position of the reference sphere using the position measurement sensor to calculate a radial direction correction value of the position measurement sensor using the measured position of the reference sphere and a preliminarily stored diameter dimension of the reference sphere in a state where the reference tool is mounted to the main spindle.

Here, "a side of the tool sensor" obviously includes a case where the reference sphere is directly disposed in the tool sensor and also includes a case where a reference sphere is separately disposed near the tool sensor.

In the disclosure of a second aspect in the above-described configuration, from the tool sensor position acquisition stage to the relative position calculation stage are performed once. From the reference tool position acquisition stage to the diameter correction value calculation stage are performed multiple times.

In the disclosure of a third aspect in the above-described configuration, in the reference sphere position acquisition stage and the diameter correction value calculating stage, the position measured by the position measurement sensor is a position of the translational axes when the position measurement sensor senses a contact with the reference sphere.

In order to achieve the above-described object, there is provided a correction value measurement system for a position measurement sensor in a machine tool according to a fourth aspect of the disclosure for measuring a length direction correction value and a radial direction correction value of the position measurement sensor in the machine tool. The machine tool includes translational axes of three or more axes, a main spindle rotatable with a tool mounted thereon, a table, the position measurement sensor mountable to the main spindle, and a control device that controls the translational axes and the main spindle. The correction value measurement system includes a reference tool, a tool sensor, a reference sphere, a tool sensor position acquisition unit, a reference tool measurement position acquisition unit, a position measurement sensor measurement position acquisition unit, a position measurement sensor length calculation unit, a reference sphere position acquisition unit, a relative position calculation unit, a reference tool position acquisition unit, a length correction value calculation unit, and a diameter correction value calculation unit. The reference tool serves as a reference for a length of the tool. The tool sensor is configured to detect a distal end position of the reference tool mounted to the main spindle. The reference sphere is installed on a side of the tool sensor. The tool sensor position acquisition unit is configured to use the reference tool mounted to the main spindle and the tool sensor and acquire and store a sensing position of a distal end of the reference tool. The reference tool measurement position acquisition unit is configured to acquire a given tool measurement position using the reference tool mounted to the main spindle and store the given tool measurement position. The position measurement sensor measurement position acquisition unit is configured to acquire a given sensor measurement position using the position measurement sensor mounted to the main spindle and store the given sensor measurement position. The position measurement sensor length calculation unit is configured to obtain a difference between the tool measurement position and the sensor measurement position, calculate a length of the position measurement sensor based on the difference and a length of the reference tool, and store the length of the position measurement sensor. The reference sphere position acquisition unit is configured to measure a position of the reference sphere using the position measurement sensor mounted to the main spindle and store the position of the reference sphere. The relative position calculation unit is configured to calculate a relative position of the reference sphere to the sensing position from the sensing position acquired by the tool sensor position acquisition unit, the position of the reference sphere acquired by the reference sphere position acquisition unit, the length of the position measurement sensor calculated by the position measurement sensor length calculation unit, and the length of the reference tool and store the relative position. The reference tool position acquisition unit is configured to acquire a reference tool position as the distal end position of the reference tool using the reference tool mounted to the main spindle and the tool sensor and store the reference tool position. The length correction value calculation unit is configured to calculate a length direction correction value of the position measurement sensor from the reference tool position acquired by the reference tool position acquisition unit, the position of the reference sphere acquired by the reference sphere position acquisition unit, the relative position calculated by the relative position calculation unit, and the length of the reference tool and store the length direction correction value. The diameter correction value calculation unit is configured to measure the position of the reference sphere using the position measurement sensor mounted to the main spindle to calculate a radial direction correction value of the position measurement sensor using the measured position of the reference sphere and a preliminarily stored diameter dimension of the reference sphere and store the radial direction correction value.

In the disclosure of a fifth aspect in the above-described configuration, the position measurement sensor is configured to measure a position of the translational axes when the position measurement sensor senses an object or the position considering a signal delay.

With the disclosure, the positional relationship between the sensing position in the tool sensor and the reference sphere is made known from the reference tool position in the tool sensor, the length of the position measurement sensor calculated based on the reference tool, and the position of the reference sphere measured by the position measurement sensor in advance. Therefore, after that, by automatically measuring the reference tool by the tool sensor and automatically measuring the reference sphere by the position measurement sensor, the length direction correction value of the position measurement sensor is automatically measurable. Additionally, when the reference sphere is automatically measured by the position measurement sensor, the radial direction correction value of the position measurement sensor is also automatically measurable simultaneously using the diameter dimension of the reference sphere.

Accordingly, even when the length and the posture of the position measurement sensor change due to, for example, thermal displacement, the correction values of the length and the diameter of the position measurement sensor can be obtained without taking time or labor. As a result, a position of an object can be highly accurately measured by the position measurement sensor.

DETAILED DESCRIPTION

The following describes embodiments of the disclosure based on the drawings.

Figure 1:
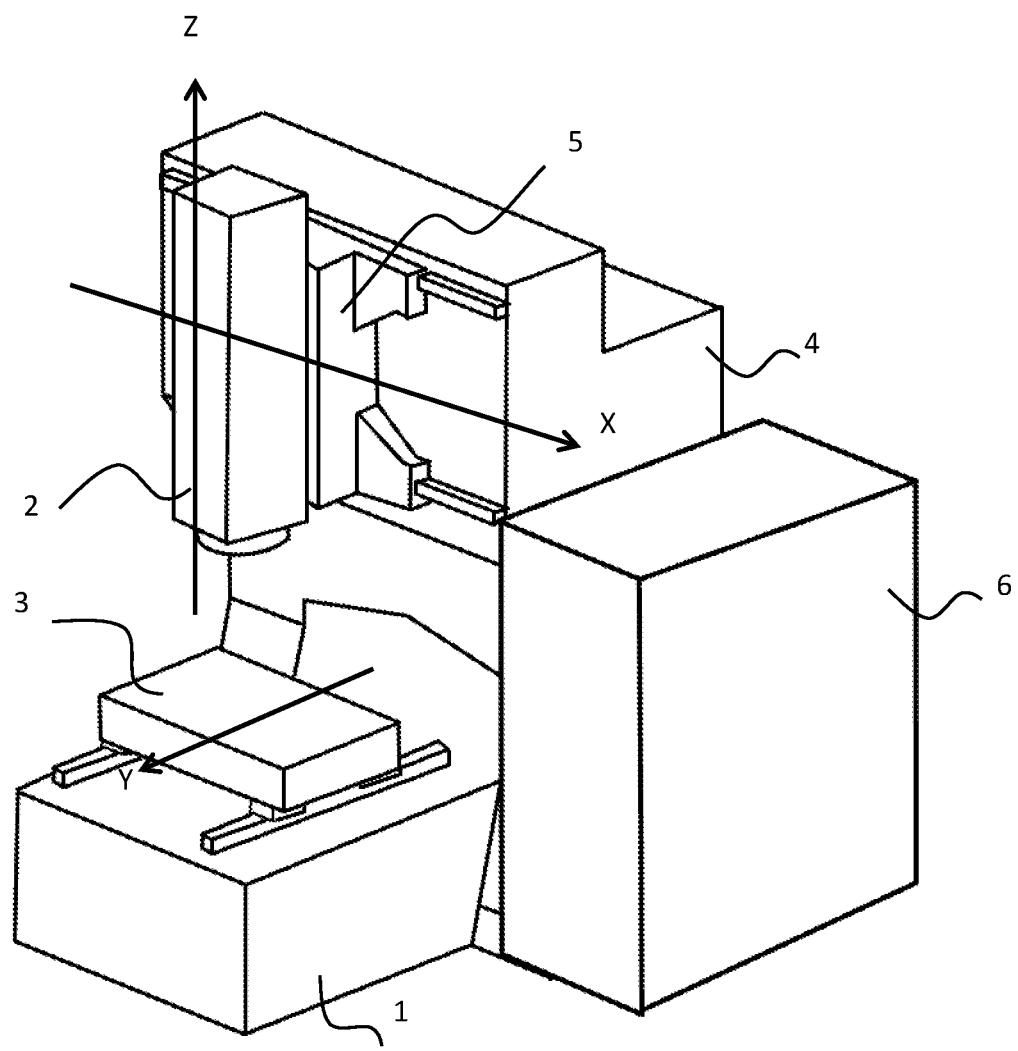
FIG. 1 is a schematic diagram of a machining center.
Figure 2:
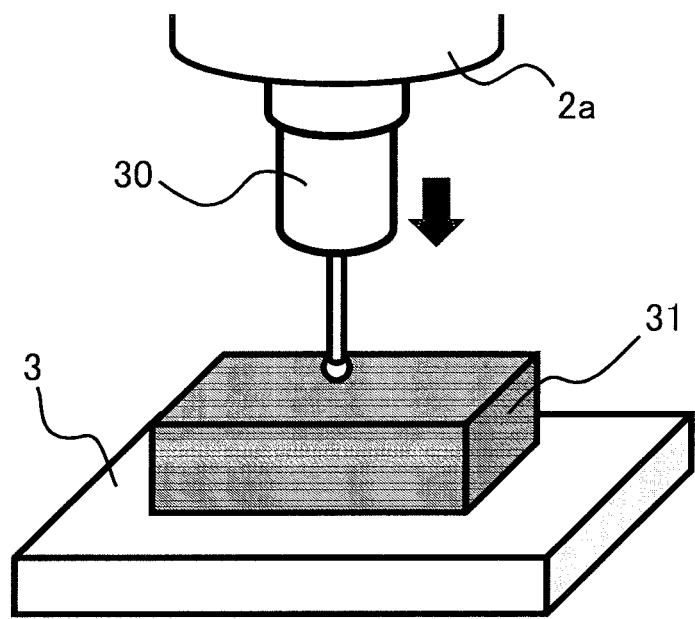
FIG. 2 is a schematic diagram of a touch probe.

FIG. 1 is a schematic diagram of a machining center as one configuration of a machine tool that includes three translational axes orthogonal to one another.

A main spindle head 2 can move in two degrees of freedom for translation relative to a bed 1 by an X-axis and a Z-axis, which are the translational axes orthogonal to one another, via a column 4 and a saddle 5. A table 3 can move in one degree of freedom for translation relative to the bed 1 by a Y-axis, which is the translational axis perpendicular to the X-axis and the Z-axis. Accordingly, the main spindle head 2 can move in three degrees of freedom for translation relative to the table 3. Each feed axis is driven by a servomotor controlled by a numerical control device 6. A workpiece is fixed to the table 3, a tool is mounted to a main spindle 2a of the main spindle head 2 to be rotated, and a relative position and a relative posture between the workpiece and the tool are controlled, thus ensuring machining of the workpiece.

In accordance with programs preliminarily stored in a storage unit, the numerical control device as a control device of the disclosure functions as a tool sensor position acquisition unit, a reference tool measurement position acquisition unit, a position measurement sensor measurement position acquisition unit, a position measurement sensor length calculation unit, a reference sphere position acquisition unit, a relative position calculation unit, a reference tool position acquisition unit, a length correction value calculation unit, and a diameter correction value calculation unit. The attachment and removal of a reference tool and a touch probe to the main spindle 2a in association with the measurement of correction values are manually performed by an operator or automatically performed by the numerical control device using a tool changer.

Note that the machine related to the disclosure is not limited to the machining center but may be a machine tool, such as a lathe, a multitasking machine, and a grinder. The number of axes is not limited to three axes but may be three axes, four axes, and six axes only for the translational axes. Further, the table 3 and the main spindle head 2 may be a mechanism having one degree or more of freedom for rotation with rotation axis.

Figure 3:
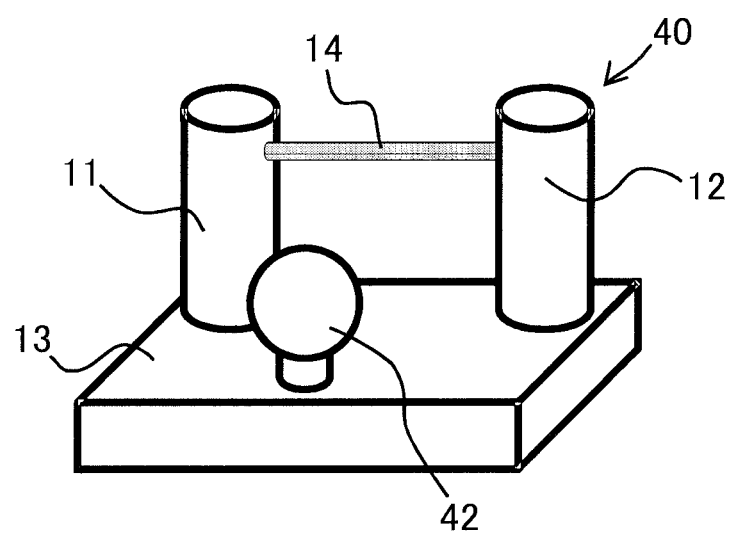
FIG. 3 is a schematic diagram of a laser sensor as one example of a tool sensor of the disclosure.
Figure 4:
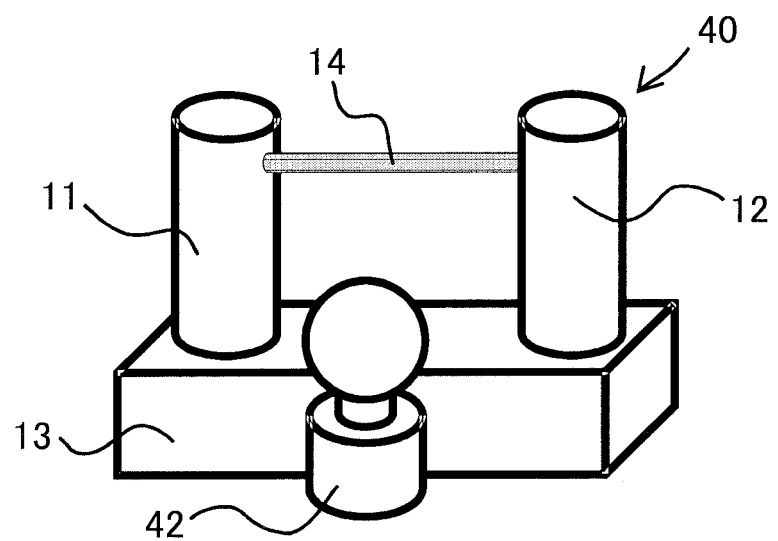
FIG. 4 is a schematic diagram of the laser sensor as one example of the tool sensor of the disclosure.

FIG. 3 is a schematic diagram of a laser sensor 40 as one example of a tool sensor of the disclosure. The laser sensor 40 includes a laser emitting unit 11 that emits a laser 14, a laser receiving unit 12 that receives the laser 14, a base portion 13, and a reference sphere 42. The laser emitting unit 11, the laser receiving unit 12, and the reference sphere 42 are fixed to the base portion 13. The laser sensor 40 is mounted to a top surface of the table 3 of the machining center in FIG. 1. Note that, as illustrated in FIG. 4, a configuration in which the reference sphere 42 is separately placed near the base portion 13 may be employed.

Figure 5:
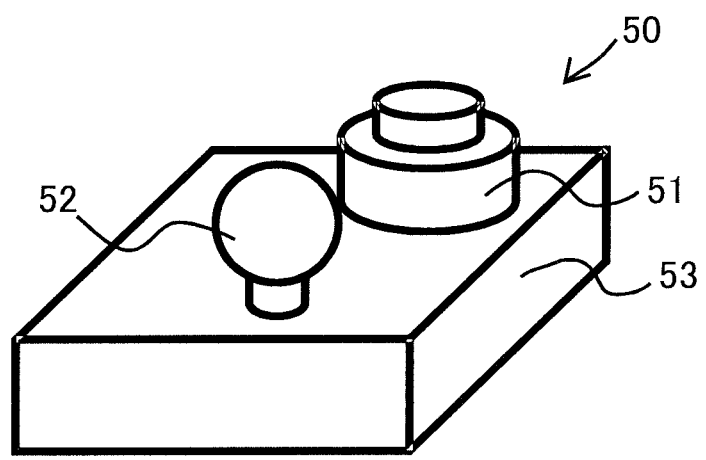
FIG. 5 is a schematic diagram of a touch sensor as one example of the tool sensor of the disclosure.
Figure 6:
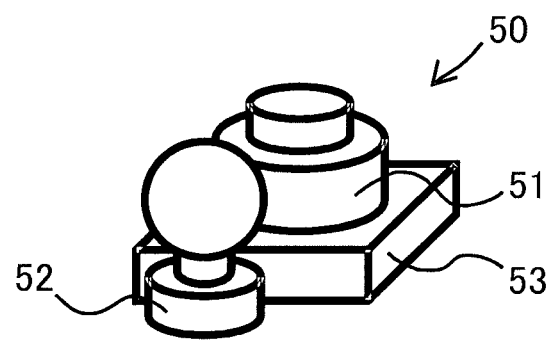
FIG. 6 is a schematic diagram of the touch sensor as one example of the tool sensor of the disclosure.

FIG. 5 is a schematic diagram of a touch sensor 50 as one example of the tool sensor of the disclosure. The touch sensor 50 includes a touch sensor portion 51, a reference sphere 52, and a base portion 53. The touch sensor portion 51 and the reference sphere 52 are fixed to the base portion 53. Similarly to the laser sensor 40, the touch sensor 50 is mounted to the top surface of the table 3 of the machining center in FIG. 1. Note that, as illustrated in FIG. 6, a configuration in which the reference sphere 52 is separately placed near the base portion 53 may be employed.

Hereinafter, a case of using the touch sensor 50 as the tool sensor will be described. The touch sensor 50 and the laser sensor 40 are inherently the same and differ only in a sensing method.

Figure 7:
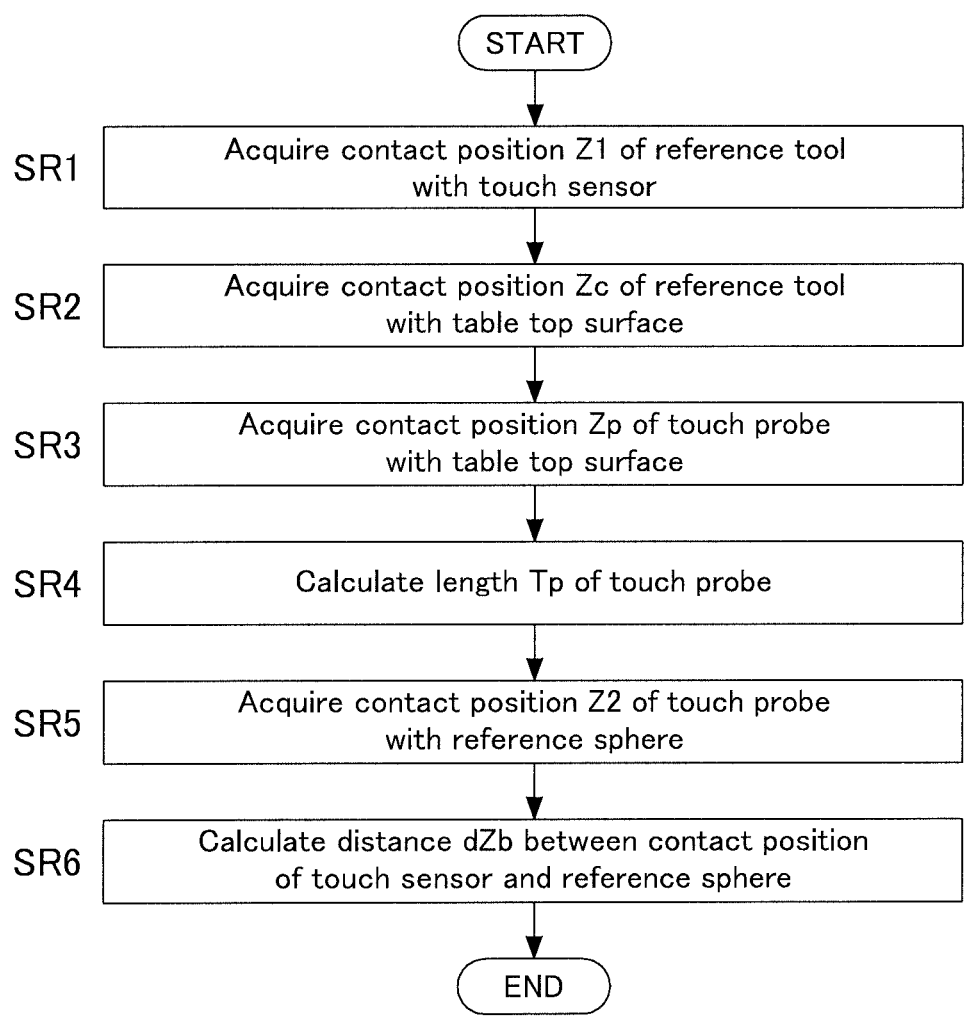
FIG. 7 is a flowchart for a measurement preparation work of the disclosure.

A procedure for a measurement preparation work will be described based on a flowchart of FIG. 7. The measurement preparation work is a work performed in advance before measuring the correction values in a length direction and a radial direction of the touch probe described later.

Figure 9:
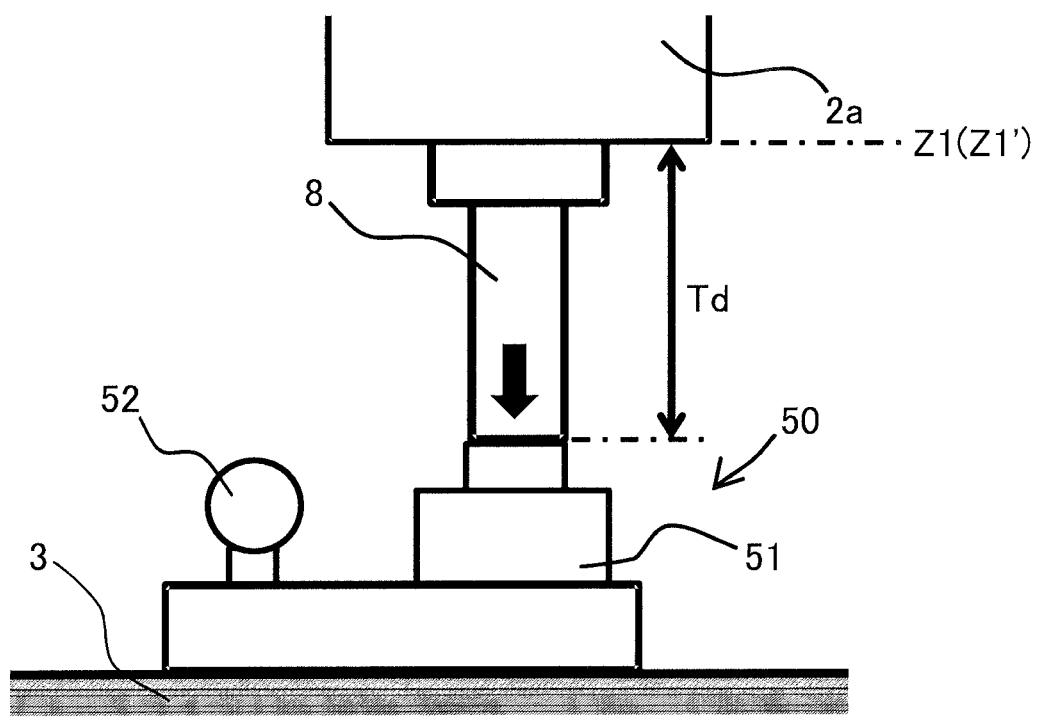
FIG. 9 is an explanatory view of Step SR1 (S1) of the measurement preparation work of the disclosure.

At Step SR1 a reference tool 8 is mounted to the main spindle 2a, and the measurement is performed by the touch sensor 50 (tool sensor position acquisition stage). Here, as illustrated in FIG. 9, the reference tool 8 is moved along the Z-axis such that the reference tool 8 contacts the touch sensor portion 51 to acquire a contact position Z1 in the Z-axis direction at a time point when a distal end of the reference tool 8 presses the touch sensor portion 51 or a time point considering a signal delay. The storage unit in the numerical control device is caused to store the acquired contact position Z1. A length Td of the reference tool 8 is also stored preliminarily in the storage unit.

Figure 10:
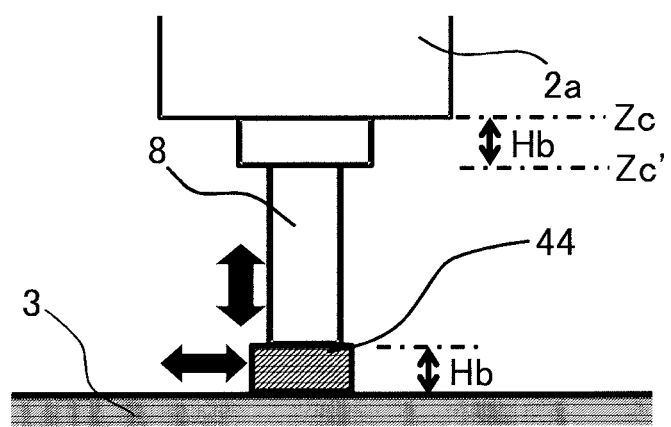
FIG. 10 is an explanatory view of Step SR2 of the measurement preparation work of the disclosure.

At Step SR2, as a pre-preparation of measuring the length of the touch probe, a given measurement position, such as the top surface of the table 3, is acquired with the reference tool 8 (reference tool measurement position acquisition stage). Here, as illustrated in FIG. 10, with the reference tool 8 mounted to the main spindle 2a, the reference tool 8 is brought into contact with a given position, such as the top surface of the table 3, via a block gauge 44, and a contact position Zc in the Z-axis direction at the time is acquired. Then, a value Zc' (=Zc−Hb) found by subtracting a thickness Hb of the block gauge 44 is stored in the storage unit. Note that, the block gauge 44 may be a block having the known thickness dimension or the like.

Figure 11:
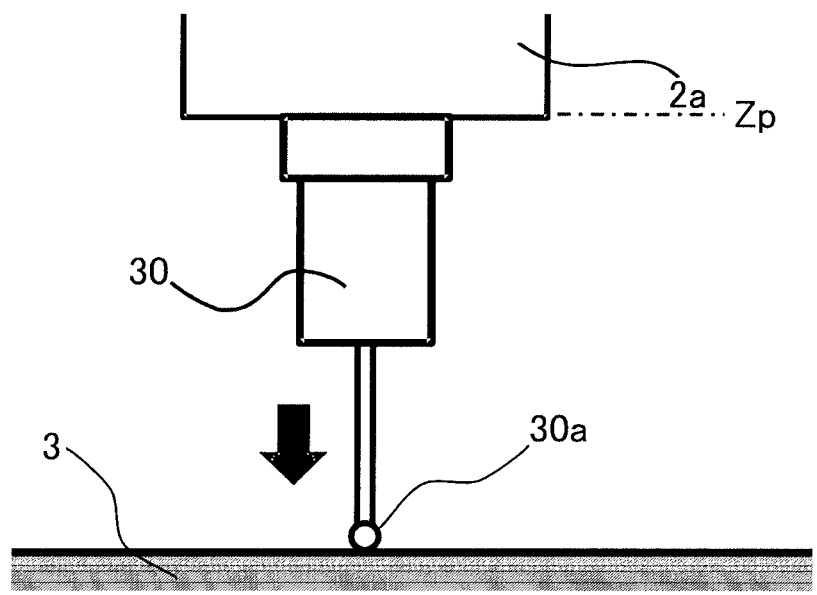
FIG. 11 is an explanatory view of Step SR3 of the measuring method of the disclosure.

At Step SR3, the touch probe 30 is mounted to the main spindle 2a to measure the given measurement position, such as the top surface of the table 3, same as that in Step SR2 (position measurement sensor measurement position acquisition stage). Here, as illustrated in FIG. 11, the touch probe 30 is moved along the Z-axis such that the touch probe 30 approaches the given measurement position, such as top surface of the table 3, same as that in Step SR2. A contact position Zp in the Z-axis direction at a time point is acquired when a stylus 30a of the touch probe 30 is brought in contact and transmits a trigger signal, or a time point considering a signal delay. The contact position Zp is stored in the storage unit.

At Step SR4, the length of the touch probe 30 at the contact as a length direction correction value of the touch probe 30 is calculated (position measurement sensor length calculation stage). From Zc' stored at Step SR2, Zp stored at Step SR3, and the reference tool length Td, a length direction correction value Tp Zp−Zc'+Td) is obtained and stored in the storage unit.

Figure 12:
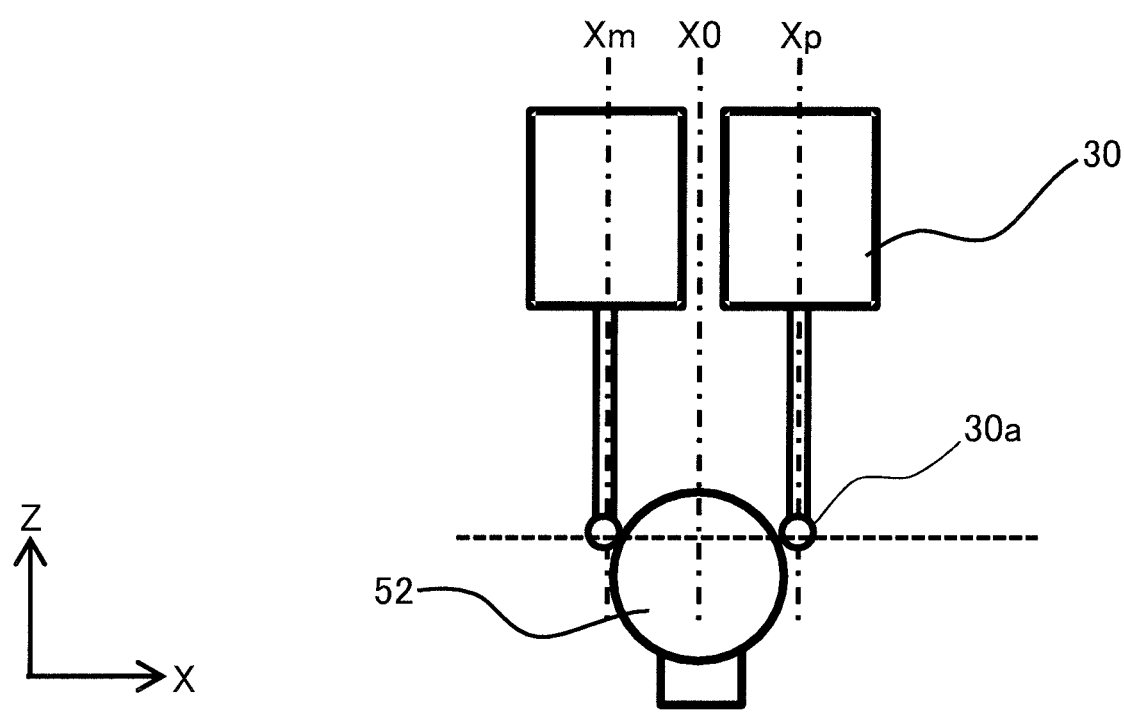
FIG. 12 is an explanatory view of Step SR5 of the measuring method of the disclosure.
Figure 13:
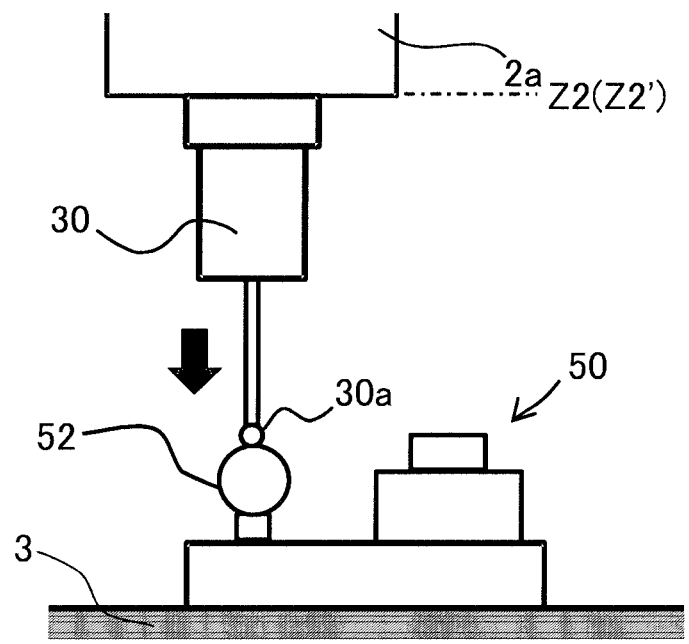
FIG. 13 is an explanatory view of Step SR5 (S2) of the measuring method of the disclosure.

At Step SR5, the touch probe 30 is mounted to the main spindle 2a to measure a contact position Z2 in the Z-axis direction of the reference sphere 52 (reference sphere position acquisition stage). Here, as illustrated in FIG. 12, coordinates Xp, Xm in the positive and negative directions of the X-axis and coordinates Yp, Ym in the positive and negative directions of the Y-axis on an identical plane in a horizontal direction of the reference sphere 52 (radial direction of the stylus 30a of the touch probe 30) are measured by the touch probe 30. Then, the main spindle 2a is indexed such that the contact points of the touch probe 30 become identical. An average value X0 of the acquired X-axis positions and an average value Y0 of the acquired Y-axis positions become X, Y coordinate values (center position) of a sphere center, respectively. As illustrated in FIG. 13, the touch probe 30 is moved along the Z-axis such that the touch probe 30 approaches the reference sphere 52 at the center position X0, Y0. The contact position Z2 at a time point is acquired when the stylus 30a of the touch probe 30 is brought in contact and the trigger signal is transmitted, or at a time point considering a signal delay.

At Step SR6, a distance (relative position) dZb in the Z-axis direction between the sensing position by the touch sensor 50 and a sensing position of the reference sphere 52 by the touch probe 30 is calculated (relative position calculation stage). From the contact position Z1 of the reference tool 8 with the touch sensor 50 obtained at Step SR1, the contact position Z2 of the touch probe 30 with the reference sphere 52 obtained at Step SR5, the length direction correction value Tp of the touch probe 30, and the reference tool length Td, the distance dZb (=Z2+Tp−(Z1+Td)) in the Z-axis direction between the contact position Z1 with the touch sensor 50 and the contact position Z2 with the reference sphere 52 is obtained and stored in the storage unit.

Figure 8:
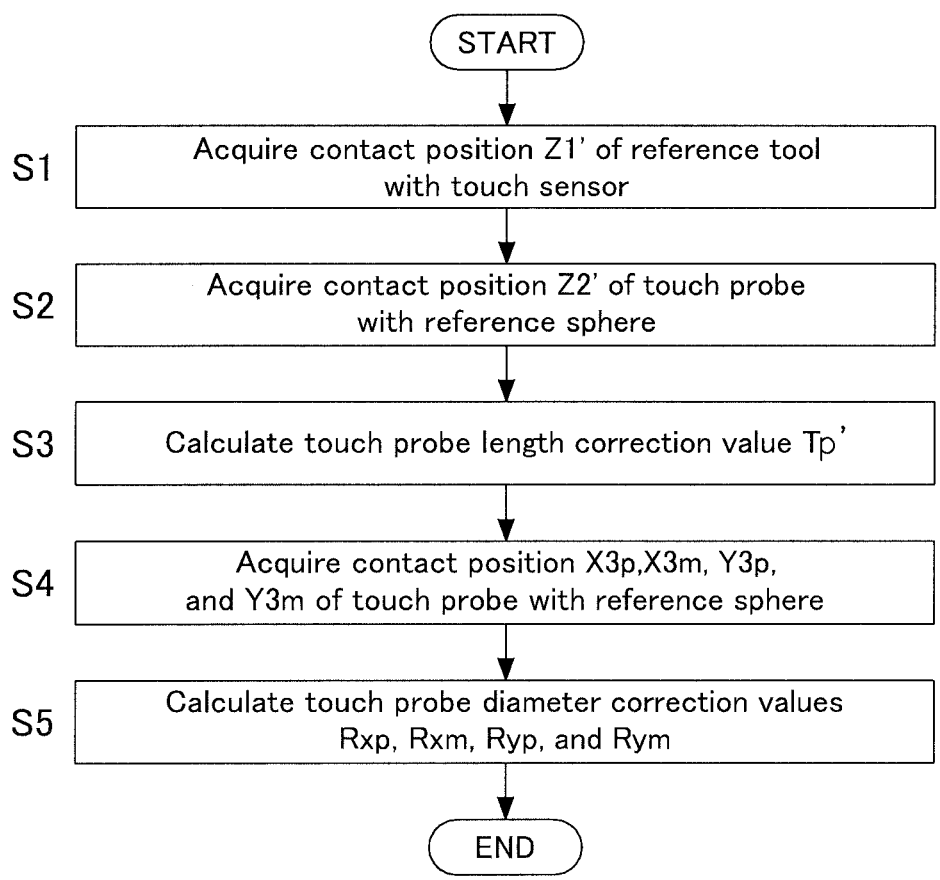
FIG. 8 is a flowchart for a measuring method of touch probe correction values of the disclosure.

Next, a measurement flow with the touch probe 30 in the disclosure will be described based on the flowchart of FIG. 8.

At Step S1, similarly to Step SR1, the reference tool 8 is mounted to the main spindle 2a, the measurement is performed by the touch sensor 50, and a contact position Z1' (see FIG. 9) (reference tool position acquisition stage) is stored in the storage unit.

At Step S2, similarly to Step SR5, the touch probe 30 is mounted to the main spindle 2a, the reference sphere 52 is measured by the touch probe 30, and a contact position Z2' (see FIG. 13) is stored in the storage unit.

At Step S3, the length of the touch probe 30 at the contact as the length direction correction value of the touch probe 30 is calculated (length correction value calculation stage). A length direction correction value Tp' (=Z1'−Z2'+dZb+Td) is obtained from the contact position Z1' stored at Step S1 and the contact position Z2' stored at Step S2, and the distance dZb between the contact position of the touch sensor 50 and the contact position of the reference sphere 52 and the reference tool length Td stored in the storage unit. The length direction correction value Tp' is stored in the storage unit.

Figure 14:
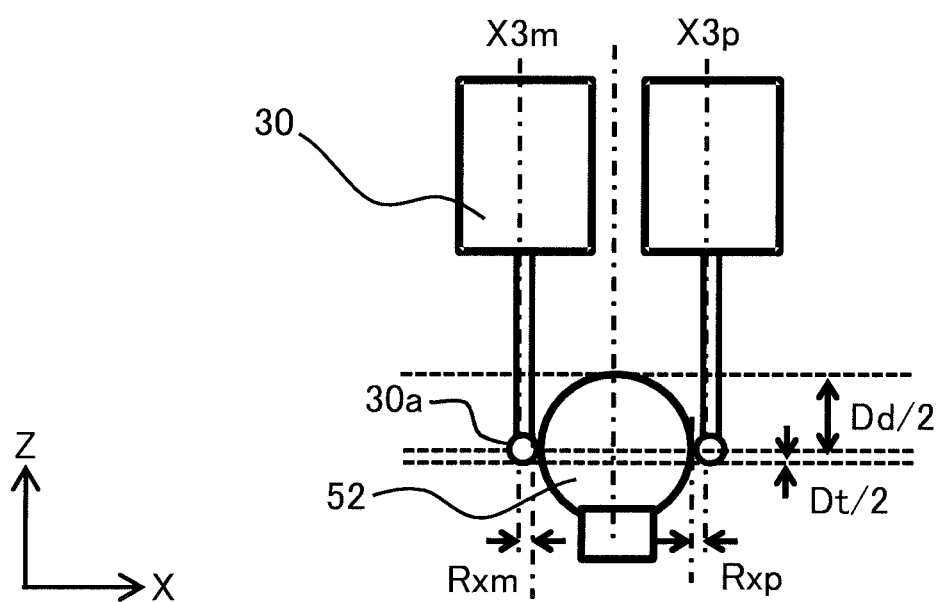
FIG. 14 is an explanatory view of Step S4 of the measuring method of the disclosure.

At Step S4, a peak in the horizontal direction of the reference sphere 52 (the radial direction of the stylus 30a) is measured. From a reference sphere diameter Dd and a sphere diameter Dt of the stylus 30a, which are preliminarily stored, the contact position Z2' stored at Step S2, and the length direction correction value Tp' stored at Step S3, a contact position Z3 (=Z2'−Tp'−Dd/2−Dt/2) of the peak in the horizontal direction of the reference sphere 52 is obtained, and stored in the storage unit. As illustrated in FIG. 14, the touch probe 30 is moved along the X-axis or the Y-axis such that the touch probe 30 approaches the reference sphere 52 at the contact position Z3. The coordinates X3p, X3m in the positive and negative directions of the X-axis and the coordinates Y3p, Y3m in the positive and negative directions of the Y-axis at a time point are acquired when the stylus 30a of the touch probe 30 is brought in contact and the trigger signal is transmitted, or a time point considering a signal delay.

At Step S5, a diameter correction value of the stylus 30a as the radial direction correction value of the touch probe 30 is calculated (S4, S5: diameter correction value calculation stage). From X3p, X3m, Y3p, Y3m stored at Step S4 and the preliminarily stored reference sphere diameter Dd, radial direction correction values Rxp (=X3p−(X3p−X3m)/2−Dd/2), Rxm (=X3m−(X3p−X3m)/2−Dd/2), Ryp (=Y3p−(Y3p−Y3m)/2−Dd/2), and Rym (=Y3m−(Y3p−Y3m)/2−Dd/2) of the stylus 30a are obtained, and stored in the storage unit.

Thus, the correction value measurement method and the correction value measurement system of the touch probe 30 (position measurement sensor) of the configurations perform Step SR1 of acquiring the sensing position (Z1) of the distal end of the reference tool 8 using the touch sensor 50 (tool sensor) and Step SR2 of acquiring the given tool measurement position (Zc) using the reference tool 8. Then, Step SR3 of acquiring the given sensor measurement position (Zp) is performed by using the touch probe 30 (position measurement sensor). Step SR4 is performed to obtain the difference between the tool measurement position (Zc) and the sensor measurement position (Zp) and obtaining the length (Tp) of the touch probe 30 based on the difference and the length (Td) of the reference tool 8. Additionally, Step SR5 of measuring the position (Z2) of the reference sphere 52 is performed by using the touch probe 30. Step SR6 is performed to calculate the relative position (dZb) of the position (Z2) of the reference sphere 52 with respect to the sensing position (Z1) from the sensing position (Z1), the position (Z2) of the reference sphere 52, the length (Tp) of the touch probe 30, and the length (Td) of the reference tool 8.

Then, Step S1 is performed to acquire the reference tool position (Z1') of the reference tool 8 using the touch sensor 50. Steps S2 and S3 are performed to calculate the length direction correction value (Tp') of the touch probe 30 from the reference tool position (Z1'), the position (Z2') of the reference sphere 52 measured using the touch probe 30, the relative position (dZb), and the length (Td) of the reference tool 8. Additionally, Steps S4 and S5 of measuring the position (X3p, X3m, Y3p, Y3m) of the reference sphere 52 are performed by using the touch probe 30 and calculating the radial direction correction values (Rxp, Rxm, Ryp, Rym) of the touch probe 30 using the measured position (X3p, X3m, Y3p, Y3m) of the reference sphere 52 and the preliminarily stored diameter dimension (Dd) of the reference sphere 52.

Accordingly, the positional relationship (dZb) between the sensing position by the touch sensor 50 and the reference sphere 52 is made known from the position (Z1) of the reference tool 8 by the touch sensor 50, the length (Tp) of the touch probe 30 calculated based on the reference tool 8, and the position (Z2) of the reference sphere 52 measured by the touch probe 30 in advance. Subsequently, by automatically measuring the reference tool 8 by the touch sensor 50 and automatically measuring the reference sphere 52 by the touch probe 30, the length direction correction value of the touch probe 30 is automatically measurable. Additionally, when the reference sphere 52 is automatically measured by the touch probe 30, the radial direction correction value of the stylus 30a of the touch probe 30 is also automatically measurable simultaneously using the diameter dimension of the reference sphere 52.

Accordingly, even when the length and the posture of the touch probe 30 change due to, for example, thermal displacement, the correction values of the length and the diameter of the touch probe 30 can be obtained without taking time or labor, and a position of an object can be highly accurately measured by the touch probe 30.

In the configuration, although Steps SR1 to SR6 as the measurement preparation work are enough to be performed once, Steps S1 to S5 may be performed multiple times.

In the configuration, when the length correction value of the touch probe is calculated at S3, the contact position of the touch probe with the reference sphere is measured at S2. The process may be omitted and the contact position acquired at Step SR5 may be used. An order of the calculation of the length correction value and the calculation of the diameter correction value may be opposite to that in the above-described configuration.

The position measurement sensor is not limited to the touch probe, and a non-contact sensor, such as a laser displacement sensor, can also be employed. In this case, not the length at the contact but an apparent distance between a measured object and the non-contact sensor at the measurement becomes the measurement target.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A correction value measurement method for a position measurement sensor in a machine tool for measuring a length direction correction value and a radial direction correction value of the position measurement sensor mountable to a main spindle using the machine tool, the machine tool including translational axes of three or more axes, the main spindle rotatable with a tool mounted thereon, and a table wherein:
   a tool sensor and a reference sphere disposed on a side of the tool sensor are used,
   the correction value measurement method comprising:
   acquiring a sensing position of a distal end of a reference tool using the tool sensor in a state where a reference tool serving as a reference for a length of the tool is mounted to the main spindle,
   acquiring a given tool measurement position using the reference tool mounted to the main spindle;
   acquiring a given sensor measurement position using the position measurement sensor mounted to the main spindle;
   obtaining a difference between the tool measurement position and the sensor measurement position to obtain a length of the position measurement sensor based on the difference and a length of the reference tool;
   measuring a position of the reference sphere using the position measurement sensor mounted to the main spindle;
   calculating a relative position of the reference sphere with respect to the sensing position from the sensing position acquired by the using, the position of the reference sphere acquired by the measuring, the length of the position measurement sensor calculated by the obtaining, and the length of the reference tool;
   acquiring a reference tool position as a distal end position of the reference tool using the tool sensor in a state where the reference tool is mounted to the main spindle,
   calculating a length direction correction value of the position measurement sensor from the reference tool position acquired by the mounting of the reference tool, the position of the reference sphere acquired by the measuring, the relative position calculated by the calculating, and the length of the reference tool; and
   measuring the position of the reference sphere using the position measurement sensor to calculate a radial direction correction value of the position measurement sensor using the measured position of the reference sphere and a preliminarily stored diameter dimension of the reference sphere in a state where the reference tool is mounted to the main spindle.

2. The correction value measurement method of the position measurement sensor in the machine tool according to claim 1, wherein
   from the acquiring a sensing position to the calculating a relative position are performed once, and
   from the acquiring a reference tool position to the calculating a radial direction correction value are performed multiple times.

3. The correction value measurement method of the position measurement sensor in the machine tool according to claim 1, wherein
   in the measuring a position of the reference sphere and the calculating a radial direction correction value, the position measured by the position measurement sensor is a position of the translational axes when the position measurement sensor senses a contact with the reference sphere.

4. A correction value measurement system for a position measurement sensor in a machine tool for measuring a length direction correction value and a radial direction correction value of the position measurement sensor in the machine tool, the machine tool including translational axes of three or more axes, a main spindle rotatable with a tool mounted thereon, a table, the position measurement sensor mountable to the main spindle, and a control device that controls the translational axes and the main spindle, the correction value measurement system comprising:
   a reference tool serving as a reference for a length of the tool;
   a tool sensor configured to detect a distal end position of the reference tool mounted to the main spindle;
   a reference sphere installed on a side of the tool sensor; and
   the control device, which includes:
   a tool sensor position acquisition unit configured to use the reference tool mounted to the main spindle and the tool sensor, and acquire and store a sensing position of a distal end of the reference tool;
   a reference tool measurement position acquisition unit configured to acquire a given tool measurement position using the reference tool mounted to the main spindle and store the given tool measurement position;

a position measurement sensor measurement position acquisition unit configured to acquire a given sensor measurement position using the position measurement sensor mounted to the main spindle and store the given sensor measurement position;

a position measurement sensor length calculation unit configured to obtain a difference between the tool measurement position and the sensor measurement position, calculate a length of the position measurement sensor based on the difference and a length of the reference tool, and store the length of the position measurement sensor;

a reference sphere position acquisition unit configured to measure a position of the reference sphere using the position measurement sensor mounted to the main spindle and store the position of the reference sphere;

a relative position calculation unit configured to calculate a relative position of the reference sphere with respect to the sensing position from the sensing position acquired by the tool sensor position acquisition unit, the position of the reference sphere acquired by the reference sphere position acquisition unit, the length of the position measurement sensor calculated by the position measurement sensor length calculation unit, and the length of the reference tool, and store the relative position;

a reference tool position acquisition unit configured to acquire a reference tool position as the distal end position of the reference tool using the reference tool mounted to the main spindle and the tool sensor, and store the reference tool position;

a length correction value calculation unit configured to calculate a length direction correction value of the position measurement sensor from the reference tool position acquired by the reference tool position acquisition unit, the position of the reference sphere acquired by the reference sphere position acquisition unit, the relative position calculated by the relative position calculation unit, and the length of the reference tool, and store the length direction correction value; and a diameter correction value calculation unit configured to measure the position of the reference sphere using the position measurement sensor mounted to the main spindle to calculate a radial direction correction value of the position measurement sensor using the measured position of the reference sphere and a preliminarily stored diameter dimension of the reference sphere, and store the radial direction correction value.

5. The correction value measurement system of the position measurement sensor in the machine tool according to claim 4, wherein the position measurement sensor is configured to measure a position of the translational axes when the position measurement sensor senses an object or the position considering a signal delay.

* * * * *